(12) United States Patent
Knorowski et al.

(10) Patent No.: US 6,279,420 B1
(45) Date of Patent: Aug. 28, 2001

(54) BALANCE WEIGHT FOR A ROTARY COMPONENT IN TURBOMACHINERY, METHODS OF INSTALLATION AND INSTALLATION TOOLS

(75) Inventors: Victor John Knorowski, Rexford; David Robert Skinner, Pattersonville; Alexander Morson, Clifton Park, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/376,602

(22) Filed: Aug. 18, 1999

(51) Int. Cl.[7] ........................................ F16F 15/22
(52) U.S. Cl. ............... 74/573 R; 416/144; 416/215; 409/141; 409/234; 74/572
(58) Field of Search ............... 74/572–574; 403/143; 409/234, 141; 416/144, 215

(56) References Cited

U.S. PATENT DOCUMENTS

| 3,032,318 | * | 5/1962 | Lindblom ............................ 253/95 |
| 3,736,811 | * | 6/1973 | Neary ................................ 74/573 R |
| 4,098,127 |   | 7/1978 | Shiga et al. . |
| 4,477,226 | * | 10/1984 | Carreno ............................ 416/144 |
| 4,842,485 | * | 6/1989 | Barber ............................... 416/144 |
| 5,018,943 | * | 5/1991 | Corsmeier et al. .................. 416/144 |
| 5,027,873 | * | 7/1991 | Anselm ............................... 144/224 |
| 5,487,640 |   | 1/1996 | Shaffer . |
| 6,053,678 | * | 4/2000 | D'Andrea ........................... 409/141 |

FOREIGN PATENT DOCUMENTS

| 55-72937 | * | 6/1980 | (JP) ................................... 74/573 R |
| 56-153956 | * | 11/1981 | (JP) ................................... 74/573 R |

* cited by examiner

Primary Examiner—Vinh T. Luong
(74) Attorney, Agent, or Firm—Nixon & Vanderhye

(57) ABSTRACT

A balance weight has first and second margins at right angles to one another with the second margin larger than the first margin. A balance weight groove in a rotor has outer and inner wall portions, with the outer wall portions spaced a distance less than the spacing between the inner wall portions. The balance weight has a central threaded opening receiving a screw and a driving slot in the upper face of the weight. An insertion tool is threaded to the balance weight to insert the balance weight through a turbomachinery access opening into the groove. The tool is rotated to locate the second margins below the outer wall portions of the groove. By inserting a driving tool through the insertion tool, the screw is rotated to lock the balance weight to the rotor and in the groove. Upon removal of the insertion and driving tools, a staking tool is inserted through turbine access opening to stake the balance weight and rotor and the screw and balance weight.

7 Claims, 6 Drawing Sheets

BALANCE WEIGHT FOR A ROTARY COMPONENT IN TURBOMACHINERY, METHODS OF INSTALLATION AND INSTALLATION TOOLS

BACKGROUND OF THE INVENTION

The present invention relates to a balance weight receivable in a balance weight groove in turbomachinery, for example, a steam turbine, methods of remotely installing the balance weight in the groove without removal of turbomachinery casing and tools for installing the balance weight within the groove.

In the manufacture of turbomachinery, for example, steam turbines, final balancing of the rotating component is an essential and important step. Also, at several times during the life of a steam turbine, it is usually necessary to rebalance the rotating component. This is typically accomplished by adding weights to the rotors to compensate for the rotational effects of a bowed rotor, missing or modified rotor components such as buckets or covers, or to lower the vibration levels at which the unit is operating. Weight grooves used to balance rotors during manufacture of a turbine conventionally have a T-shaped or dovetail configuration. Access ports through the casing are typically not provided in older turbines. The weights manufactured as original equipment in such turbines are usually dovetail or T-shaped in configuration and require staking to fix the weights to the rotary component. For balance weight grooves that are intended for rebalancing during service, access ports are typically provided through the casings and the balance weights are usually of a screw plug type.

To convert a rotor that had only a factory balance weight provision to one capable of field balancing, it is necessary to increase the volume of material available for the installation of screw-type plug weights by welding. This process was very time-consuming and expensive. Additionally, the welding process, because of the input of heat to the rotor forging, required that the material be stress-relieved after welding. Re-machining of many of the tight fits on the rotor body was also frequently necessary after the welding and stress relief. This process was also expensive as the rotor required removal from the turbine before the necessary machining tools could be utilized to effect the changes. Also, the casing needed to be modified to provide an access port through which field balance weights could be installed in the rotor. Consequently, there is a need to provide a balance weight/groove combination for both factory and field installation, a method of installing the balance weight in the groove and tools for effecting the installation.

BRIEF SUMMARY OF THE INVENTION

In accordance with a preferred embodiment of the present invention, there is provided a balance weight for insertion in a groove of a rotating component, for example, a rotor of turbomachinery. Preferably, the groove has a wedge or dovetail configuration or a T-shaped slot. Particularly, the balance weight has a configuration generally complementary to the cross-sectional configuration of the groove. Characteristically, outer and inner wall portions of each type of groove are spaced respective first and second distances from one another, with the second distance being greater than the first distance. The balance weight has first margins having a first dimension less than the first distance, enabling the balance weight in a first orientation to be inserted into the groove. The balance weight also has second margins having a second dimension greater than the first distance such that, upon rotation of the balance weight in the groove into a second orientation, the second margins lie within the groove inwardly of the outer wall portions of the groove. Additionally, a screw is threaded through the balance weight. By threading the screw with the balance weight in the groove, the balance weight is elevated within the groove to engage the second margins of the balance weight against the opposing outer walls of the groove to retain the balance weight within the groove. With the balance weight thus engaged, the balance weight can be staked to the rotor and the screw staked to the balance weight.

To install the balance weight, an installation tool is inserted through access openings in the casing and releasably carries the balance weight at a distal end of the tool for insertion into the groove. The insertion tool comprises an elongated body, preferably tubular, having at least one and preferably two rods, generally coextensive with the body and which rods are rotatable for screwthreaded engagement with female threaded sockets on the balance weight such that the balance weight can be disposed within the turbomachinery through an access opening in its casing by the installation tool and inserted in the groove. The insertion tool also includes a head shaped for reception in a complementary-shaped slot on the balance weight whereby, by rotating the insertion tool, the balance weight can be rotated within the groove from its first orientation to its second orientation to locate the second margins below the outer wall portions. The insertion tool also includes a central opening through its body through which is received an elongated driver. The driver has a head for engaging the screw of the balance weight. By rotating the driver and hence the screw, the balance weight is elevated within the groove such that the second margins engage the outer wall portions of the groove to clamp the balance weight to the rotor against circumferential, rotational and radial movement. The insertion tool is then detached from the balance weight by unthreading the rod(s) from the balance weight and withdrawn through the access opening. Subsequently, a staking tool is inserted through the access openings. The staking tool has a pair of staking projections for staking the balance weight and the rotor component to one another. The staking tool also includes another staking projection to stake the balance weight and screw to one another.

In a preferred embodiment according to the present invention, there is provided apparatus for balancing a rotational component about an axis of rotation, comprising a rotor having a generally circumferentially extending groove at least in part about the axis of rotation, opposing walls of the groove having inner and outer portions with the outer wall portions spaced a first distance from one another and the inner wall portions spaced a second distance from one another greater than the first distance, a balance weight having first margins with a first dimension less than the first distance enabling the balance weight, in a first orientation relative to the groove, for reception in the groove, the balance weight having second margins with a second dimension greater than the first dimension and the first distance such that, upon rotation of the balance weight in the groove to a second orientation relative to the groove, the second margins lie within the groove inwardly of and in registration with the outer wall portions and a screw threadedly received in the balance weight and engageable with a base of the groove, the balance weight being displaceable away from the base in response to rotation of the screw relative to the balance weight to engage the second margins against the outer wall portions to retain the balance weight in the groove against circumferential and outward movement thereof relative to the groove.

In a further preferred embodiment according to the present invention, there is provided for use in balancing a rotor about an axis of rotation wherein the rotor has a generally circumferentially extending groove extending at least in part about the axis of rotation, a balance weight, comprising a balance weight body having first margins opposite one another and spaced from one another a first dimension enabling the balance weight body for reception in the groove, the balance weight body having second margins opposite one another and spaced from one another a second dimension greater than the first dimension for disposition within the groove, the fist and second margins of the balance weight body being generally oriented 90° relative to one another about the body and a screw threadedly received in the balance weight for engaging a base of the groove, the balance weight body having an outer face with a slot for receiving a tool to rotate the balance weight.

In a still further preferred embodiment according to the present invention, there is provided a method of remotely installing a balance weight in a groove of a rotary component in turbomachinery having at least one casing surrounding the rotary component, comprising the steps of attaching a balance weight to the end of an elongated insertion tool, inserting the balance weight and tool through an access opening in the casing, locating the balance weight in the balance weight groove using the insertion tool, rotating the balance weight in the groove to register marginal portions of the balance weight below marginal wall portions of the groove, securing the balance weight in the groove by threading a screw through the balance weight to engage the base of the groove and engage the marginal portions of the balance weight against the marginal wall portions of the groove, detaching the tool from the balance weight and withdrawing the tool through the access opening.

In a still further preferred embodiment according to the present invention, there is provided an insertion tool for remotely inserting a balance weight through an access opening in a casing of turbomachinery into a groove of a rotary component thereof and rotating the balance weight within the groove, comprising an elongated tool body having a handle at a proximal end, a central opening through the tool body, and a tool head at an opposite distal end for engaging and rotating the balance weight, a pair of rods carried by the body straddling the central opening and rotatable relative to the tool body for releasable securement at distal ends to the balance weight, the handle enabling rotation of the tool body and the rods to rotate the balance weight in the groove.

In a still further preferred embodiment according to the present invention, there is provided a kit for remotely inserting a balance weight through an access opening in a casing of turbomachinery into a groove of a rotary component thereof and securing the balance weight within the groove, comprising an elongated tool body having a handle at a proximal end, a central opening through the body, and a tool head at an opposite distal end for engaging and rotating the balance weight, a pair of rods carried by the body straddling the tool body and rotatable relative to the tool body for releasable securement at distal ends to the balance weight, a driver receivable within the central opening for rotating a screw to engage the balance weight against marginal walls of the groove to secure the balance weight within the groove and a staking tool comprising an elongated staking tool body terminating at a distal end in a staking projection for staking the balance weight and rotary component to one another.

DETAILED DESCRIPTION OF THE INVENTION

Figure 1:
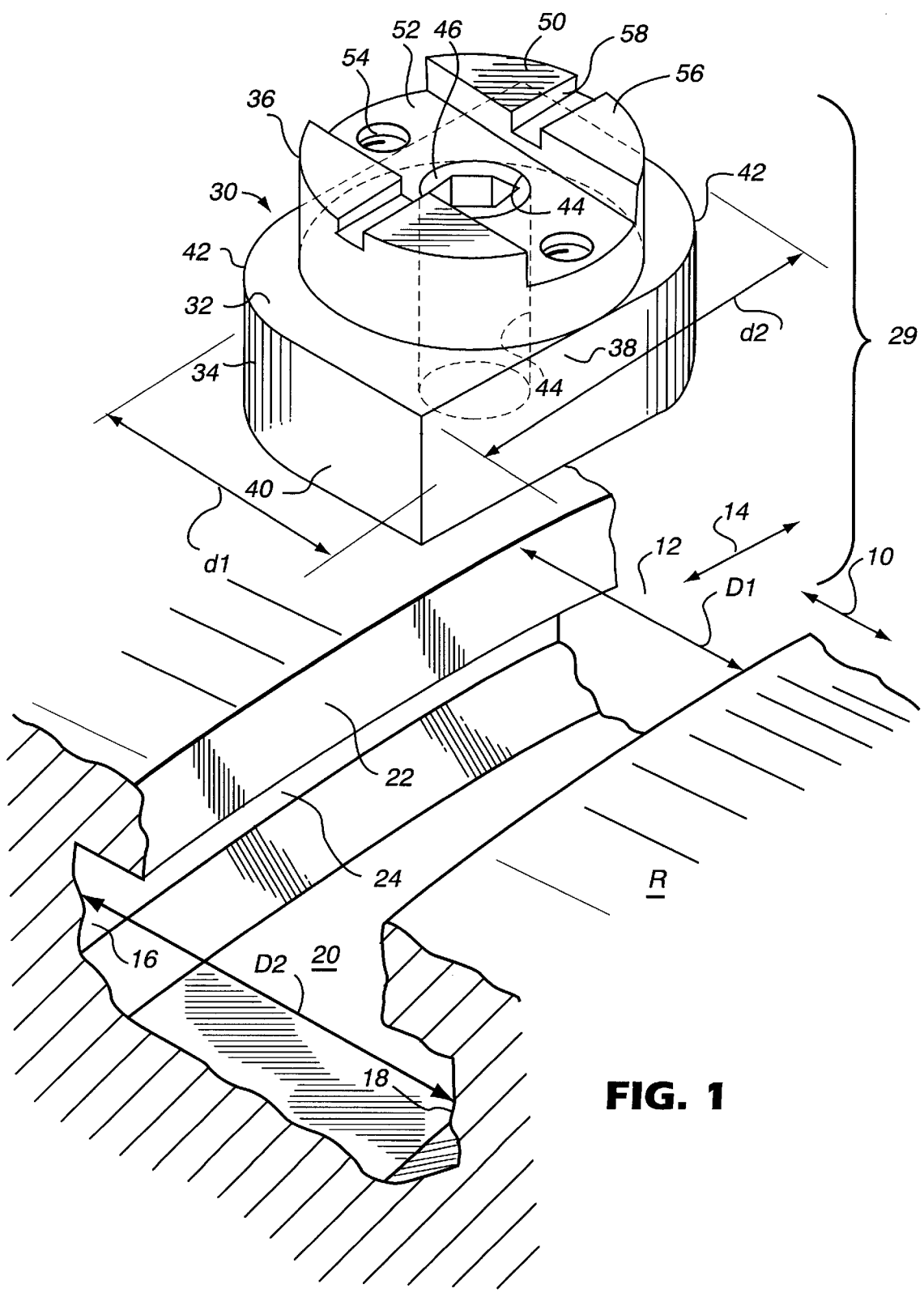
FIG. 1 is a fragmentary cross-sectional view illustrating a balance weight groove in a rotor of a turbomachine and a balance weight for insertion into the groove.

Referring now to the drawings, particularly to FIG. 1, there is illustrated a rotational component including, for example, a rotor R rotatable about an axis of rotation extending in the direction of arrow 10. The rotor R includes a circumferentially extending groove 12, the circumferential direction being indicated by the arrow 14. As illustrated, the groove 12 may extend in part or wholly about the rotor R and includes opposing walls 16 and 18 and a base 20. The groove 12 includes outer and inner wall portions 22 and 24, respectively, the outer wall portions 22 being spaced a first distance D1 less than the distance D2 between the inner wall portions 24. In the illustrated preferred embodiment, the groove 12 comprises an inverted, generally T-shaped groove wherein the outer wall portions 22 comprise axially opposed flanges. It will be appreciated that the groove may have other shapes such as a wedge or dovetail shape, it being sufficient that in all such configurations the inner wall portions, e.g., portions 24, are separated from one another a distance greater than the outer wall portions, e.g., portions 22, are separated from one another.

A balance weight 30 is also illustrated in FIG. 1 poised for insertion into the groove 12 as indicated by bracket 29 and forming part of the rotational component when inserted. Balance weight 30 includes a balance weight body 32 having lower and upper sections 34 and 36, respectively. Upper section 36 has a generally circular configuration, while the lower section 34 has first and second pairs of margins 38 and 40, respectively. First margins 38 lie on opposite sides of the balance weight 30 and have a first dimension or separation distance d1 therebetween corresponding generally to the diameter of the upper section 36. The width of the balance weight defined by the first dimension is also less than the distance D1 between the outer portions 22 of the axially opposed walls of groove 12. Balance weight 30 also includes a second pair of opposite margins 40 which project outwardly from opposite ends of the balance weight and beyond the periphery of the upper section 36. Thus, the second margins 40 define the length of the balance weight and are spaced from one another a second dimension d2, i.e., a second diameter, greater than the first distance D1 and slightly less than the distance D2. The second margins constitute flanges which project in opposite directions, comers of the flanges in the direction of rotation of the balance weight as described below being rounded or arcuate at 42.

The balance weight 30 also includes a central female threaded opening 44 extending between outer and inner faces of the balance weight. A male threaded screw 46 is threadedly received in the female threaded balance weight opening 44 and includes a socket 48 for receiving a tool, as described below. Alternatively, the socket may be replaced by a slot or Phillips head or other type of connector for receiving the head of a driving tool. Balance weight 30 also includes an outer face 50 having a diametrical slot 52 extending between opposite sides of the weight 30 and oriented such that the opposite ends of the slot lie generally flush with the second margins 38 of the lower section. A pair of female threaded apertures 54 open through the outer face 50 into the slot 52 and lie on opposite sides of the female threaded central opening 44. The outwardly projecting bosses 56 on opposite sides of the slot 52 have grooves 58 extending generally perpendicular to the slot 52 for reasons described hereinafter.

Figure 2:
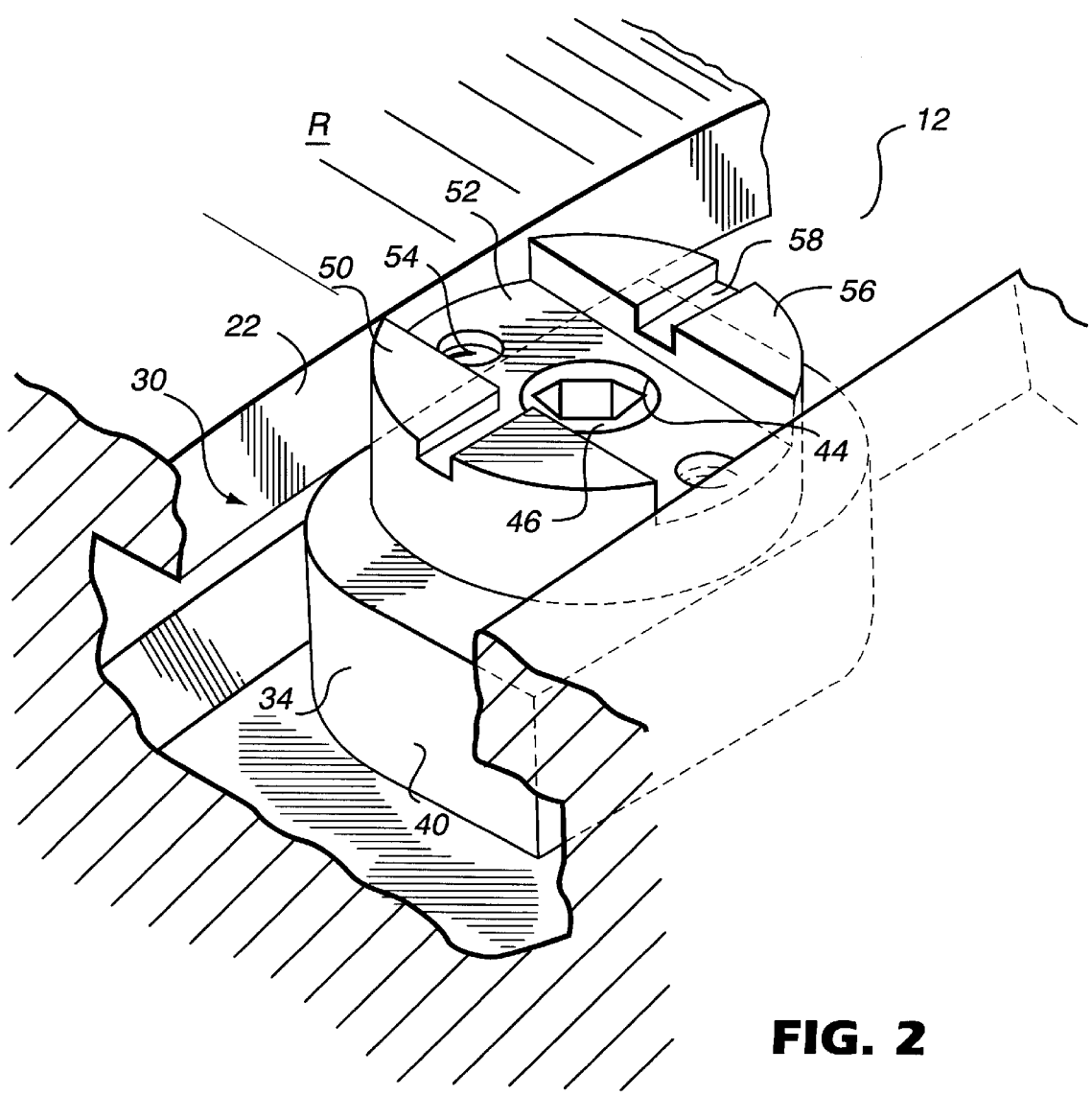
FIG. 2 is a view similar to FIG. 1 with the balance weight inserted into the groove.
Figure 3:
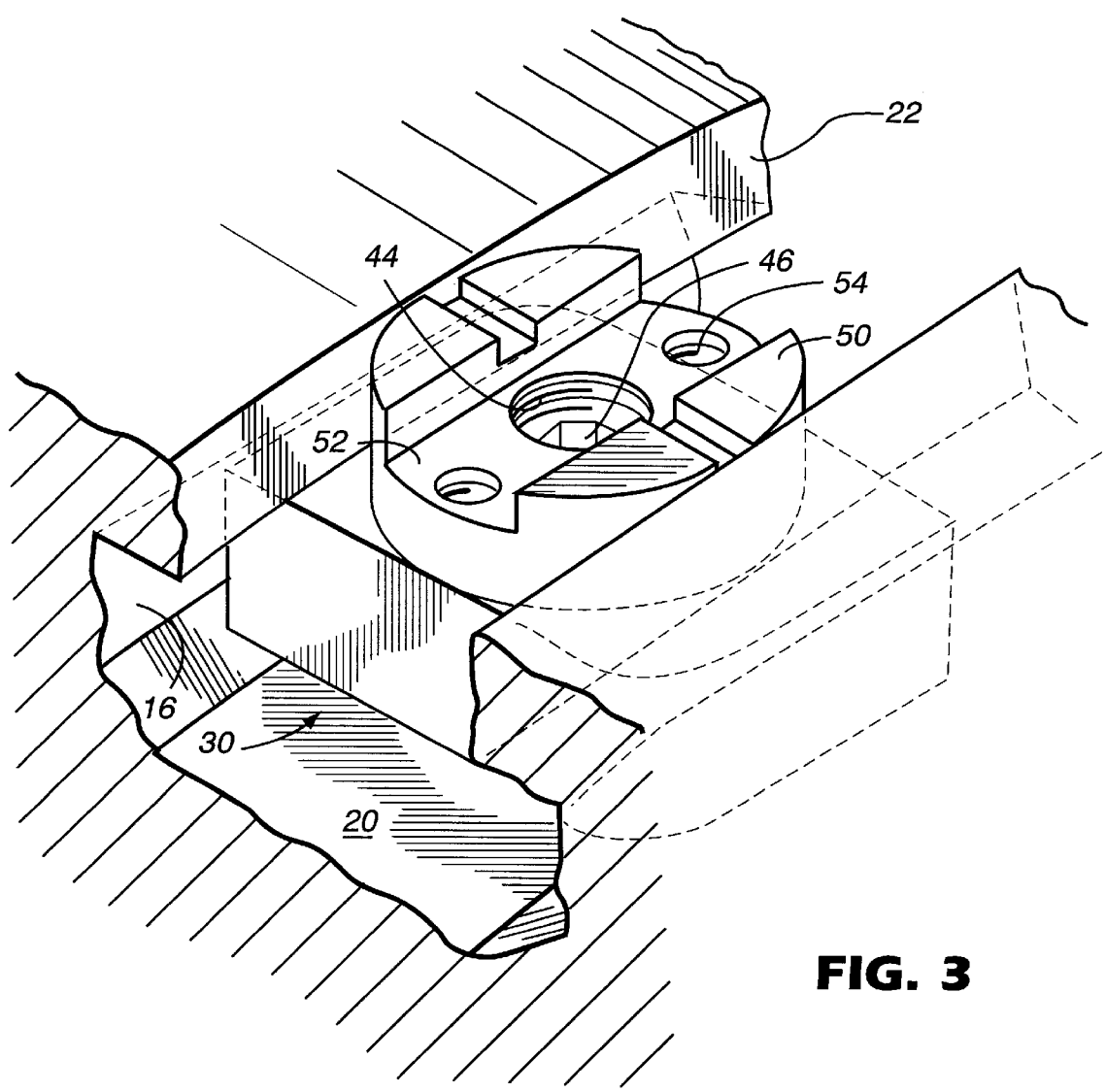
FIG. 3 is a view similar to FIGS. 1 and 2 illustrating the balance weight clamped within the groove.
Figure 4:
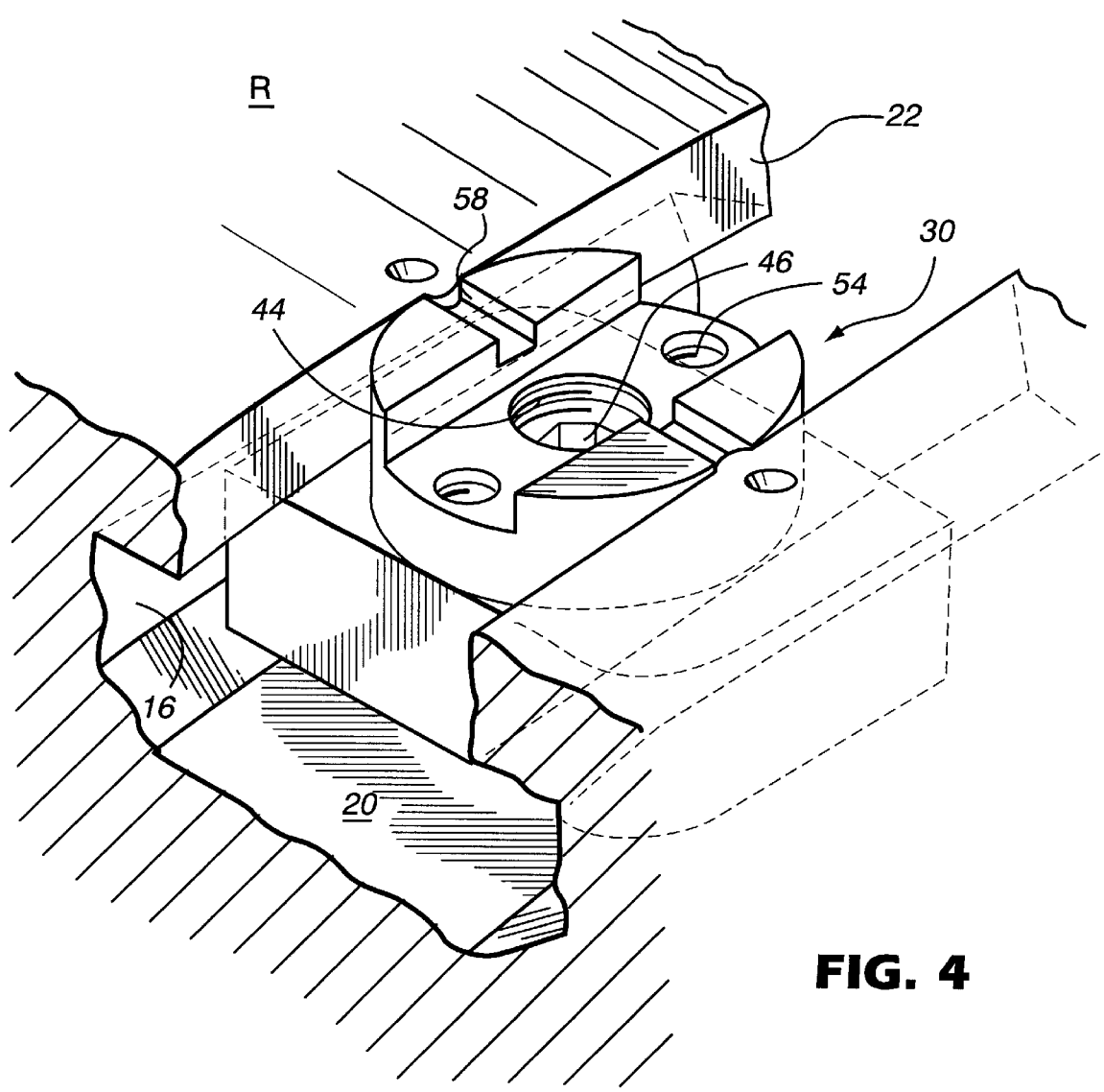
FIG. 4 is a view illustrating the balance weight finally secured and staked within the groove.

Referring to FIGS. 1–4, the sequence of movement of the balance weight relative to the groove 12 to finally secure the balance weight in the groove is illustrated. Initially, the balance weight 30 is initially oriented such that the margins 38 lie generally parallel to the outer wall portions 22 of the groove 12, i.e., the long dimension of the balance weight is aligned in the circumferential direction of the groove. In this first orientation the balance weight 30 can be inserted into the groove past the outer wall portions 22 such that the lower section 34 lies wholly within the groove between the inner wall portions 16. In this first orientation, it will be appreciated that the upper section 36 lies between the outer wall portions 22 and the lower face of the balance weight bears against the base 20 of groove 12. Comparing FIGS. 2 and 3, it will be seen that the balance weight is rotated in the groove approximately 90° into a second orientation illustrated in FIG. 3. By rotating the balance weight with the arcuate surfaces 42 of the flanges leading in the direction of rotation, the second margins 40 of the balance weight are located below or inwardly of the outer wall portions 22. With the balance weight oriented as illustrated in FIG. 3, the screw 46 is then rotated to bear against the base 20 of groove 12 and displace the balance weight away from the base to engage the outer surfaces of the second margins 40 against the outer wall portions, i.e., the undersides of the outer wall portions 22 to lock the balance weight in the groove against circumferential and outward movement relative to the groove. Consequently, the inner face of the balance weight is spaced from the base of the groove and the outer face of the outer section lies generally flush with the surface of the rotor. To finally secure the balance weight in the groove, the balance weight and rotor are staked to one another and the set screw is staked to the balance weight.

Figure 5:
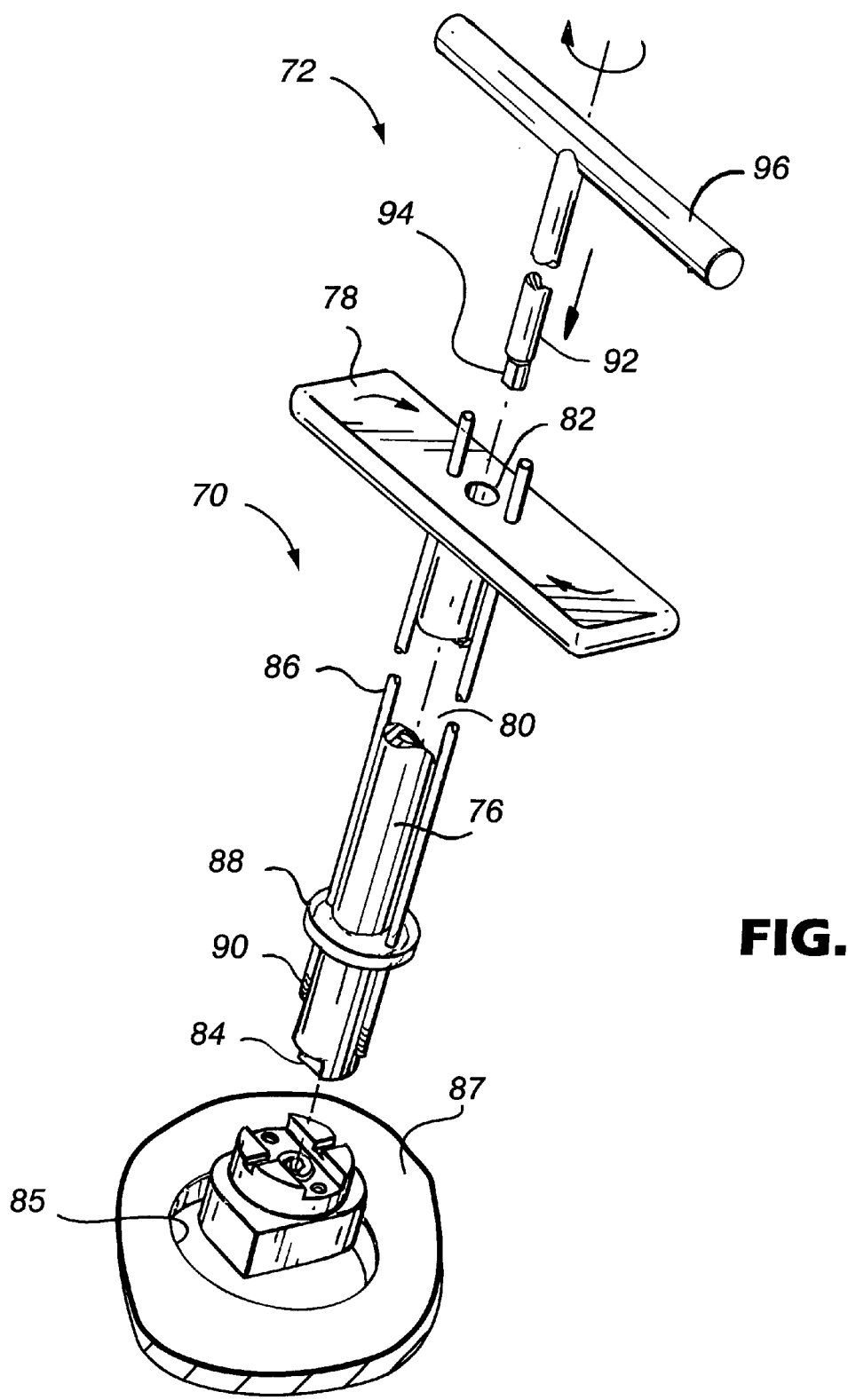
FIG. 5 is a perspective view of an insertion tool, together with a driver, and illustrated with parts broken out and in cross-section, poised for engagement with the balance weight.
Figure 6:
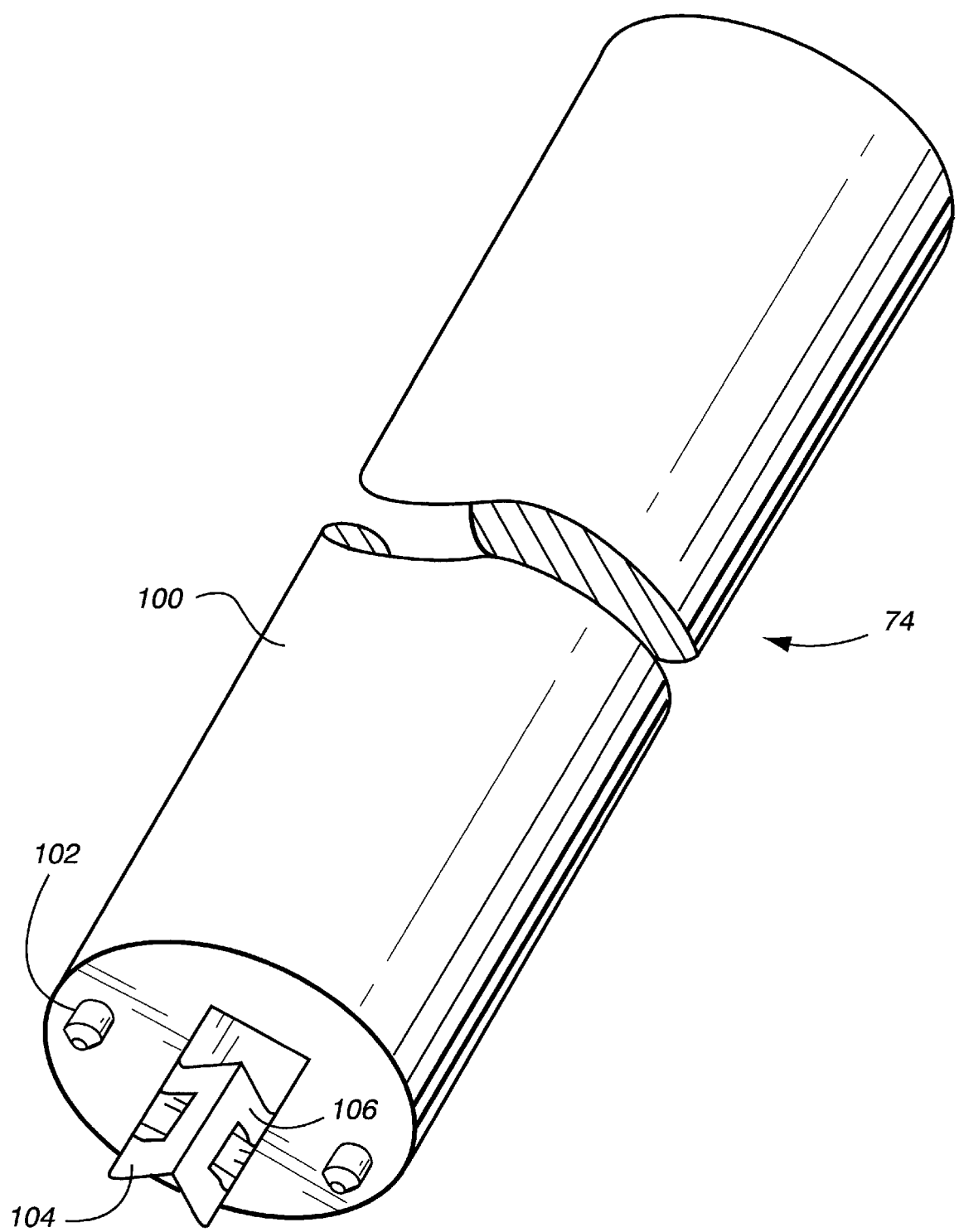
FIG. 6 is an enlarged perspective view with parts broken out and in cross-section illustrating a staking tool for finally staking the balance weight and rotor to one another and the balance weight and screw to one another.

In order to install the balance weight in the groove, particularly in a turbine in service, an access opening through the casing of the turbomachinery is formed if an access opening is not already available. Also, a kit comprised of a number of different tools is provided. Referring to FIG. 5, the kit comprises an insertion tool, generally designated 70, a driver tool, generally designated 72, and a staking tool, generally designated 74 (FIG. 6). The insertion tool 70 comprises an elongated tube 76 having a handle 78 at a proximal end of the tube. The tube 76 has a central opening 80 throughout its length and opens through the proximal end of the tube 76 and handle 78 at 82 and through a tool head 84 at the distal end of the tool 70. The tool head 84 comprises a projection for reception in the slot 52 of the balance weight.

The tool 70 also includes a rod, and preferably two rods 86, which extend through openings in handle 78 and through a guide ring 88 adjacent the distal end of the tube 76. The rods 86 thus straddle tube 76. The rods 86 also have male threads 90 at their distal ends for threaded engagement in the female threaded apertures 54 of the balance weight. The rods 86 are rotatably received through the apertures in the handle 78 and guide ring 88 to enable the rods to be threaded to and unthreaded from the balance weight.

The drive tool 72 includes an elongated rod 92 terminating at its distal end in a tool head 94 complementary to the socket of screw 46 or other type of driven connection of the screw 46. The tool 72 also includes a handle 96 at its proximal end such that the tool can be rotated. The rod 92 is sized for reception within the central opening 80 through tube 76.

Referring to FIG. 6, the staking tool 74 includes an elongated rod 100 terminating at its lower end in staking projections. Particularly, a pair of staking projections 102 are disposed at the lower end of tool 74 a distance slightly greater than the distance D1 such that the projections 102 may engage the outer surfaces of the rotor on opposite sides of the groove 58 and adjacent the slots 58, respectively. A central projection 104 on the distal end of tool 74 has a pair of projections 106 spaced from one another a distance corresponding to the diameter of the screw.

To use the tools to install the balance weight, the rods 86 are inserted through the handle 78 and guide ring 88 and threaded into the apertures 54 to attach the tool 70 to the balance weight. It will be appreciated that the tool head 84 is thereby received within the slot 82. The tool with attached balance weight is then inserted through one or more access openings 85 in the casing 87 of the turbine (see FIG. 5). The tool 70 is manipulated to orient and align the width of the balance weight with the circumferential extent of the groove such that the balance weight can be inserted into the groove past the outer wall portions 22 as illustrated in FIG. 2. With the second margins 40 below but not in registration with the outer wall portions 22, the tool 70 is rotated to rotate the balance weight in the groove to register the second margins 40 below the outer wall portions 22. To lock the balance weight within the groove, the tool 72 is then inserted through the central opening 80 such that its tool head 94 engages the socket of the screw 46. By rotating the tool 72 relative to the tool 70 and threading the screw 46 relative to the balance weight, the balance weight is displaced away from the base of the groove to engage the second margins 40 against the underside of the outer wall portions 22 as illustrated in FIG. 3. With the balance weight thus locked in place, the rods 86 may be unthreaded from the balance weight by rotating the rods from locations above the handle 78 to disconnect tool 70 from the balance weight. The tool 70 is then withdrawn from the access openings of the turbomachinery casing.

To stake the balance weight and rotor to one another and the screw and the balance weight to one another, the staking tool 70 is then inserted through the access openings to engage the balance weight. Particularly, the projections 102 engage the margin of the rotor adjacent slot 58 and central projection 104 engages the margin of the balance weight surrounding the screw. By impacting the staking tool 74, for example, with a hammer, the metal of the rotor is upset to secure the balance weight and the rotor to one another with the deformed metal in part entering slots 58. Likewise, the metal of the balance weight is upset by the projections 106 to secure the balance weight and screw to one another with the deformed metal of the balance weight in part engaging the screw.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A component rotatable about an axis of rotation, comprising:
 a rotor having a substantially circumferentially extending groove at least in part about the axis of rotation, opposing walls of said groove having inner and outer portions with said outer wall portions spaced a first distance from one another and said inner wall portions spaced a second distance from one another greater than said first distance;
 a balance weight having a rotational axis and first margins, said first margins having a first diameter about said rotational axis less than said first distance enabling said balance weight, in a first orientation about said rotational axis and relative to said groove, for reception in said groove;
 said balance weight having second margins having a second diameter about said rotational axis greater than said first diameter and said first distance, the first and second margins having the respective first and second diameters being oriented about said rotational axis approximately 90° relative to one another such that, upon rotation of said balance weight approximately 90° in said groove from said first orientation to a second orientation, the second margins lie within said groove inwardly of and in registration with said outer wall portions; and
 a screw threadedly received in said balance weight and engaging a base of said groove, said balance weight being displaceable away from said base in response to rotation of said screw relative to said balance weight to engage said second margins against said outer wall portions to retain the balance weight in the groove against circumferential and outward movement thereof relative to said groove.

2. A component to claim 1 wherein said balance weight has an outer face with a slot for receiving a tool to rotate the balance weight relative to said grove.

3. A component according to claim 1 wherein said outer wall portions comprise flanges projecting toward one another, said second margins of said balance weight in said second orientation thereof being located below said flanges in said groove and engaging with said flanges in response to rotation of said screw relative to said balance weight.

4. A component rotatable about an axis of rotation, comprising:
 a rotor having a substantially circumferentially extending groove at least in part about the axis of rotation, opposing walls of said groove having inner and outer portions with said outer wall portions spaced a first distance from one another and said inner wall portions spaced a second distance from one another greater than said first distance;
 a balance weight having first margins with a first dimension less than said first distance enabling said balance weight, in a first orientation relative to said groove, for reception in said groove;
 said balance weight having second margins with a second dimension greater than said first dimension and said first distance such that, upon rotation of said balance weight in said groove to a second orientation relative to said groove, the second margins lie within said groove inwardly of and in registration with said outer wall portions;
 a screw threadedly received in said balance weight and engaging a base of said groove, said balance weight being displaced away from said base in response to rotation of said screw relative to said balance weight to engage said second margins against said outer wall portions to retain the balance weight in the groove against circumferential and outward movement thereof relative to said groove;
 said outer wall portions comprising flanges projecting toward one another, said second margins of said balance weight in said second orientation thereof being located below said flanges in said groove and engaged with said flanges in response to rotation of said screw relative to said balance weight; and
 said second margins comprising second flanges projecting from said balance weight, said second flanges having arcuate edges along one side thereof facing in the direction of rotation of the balance weight within the groove.

5. A component rotatable about an axis of rotation, comprising:
 a rotor having a substantially circumferentially extending groove at least in part about the axis of rotation, opposing walls of said groove having inner and outer portions with said outer wall portions spaced a first distance from one another and said inner wall portions spaced a second distance from one another greater than said first distance;
 a balance weight having first margins with a first dimension less than said first distance enabling said balance weight, in a first orientation relative to said groove, for reception in said groove;
 said balance weight having second margins with a second dimension greater than said first dimension and said first distance such that, upon rotation of said balance weight in said groove to a second orientation relative to said groove, the second margins lie within said groove inwardly of and in registration with said outer wall portions;
 a screw threadedly received in said balance weight and engaging a base of said groove, said balance weight being displaced away from said base in response to rotation of said screw relative to said balance weight to engage said second margins against said outer wall portions to retain the balance weight in the groove against circumferential and outward movement thereof relative to said groove; and
 said balance weight having an outer face including a pair of female threaded openings for receiving male threaded rods for remotely installing the balance weight in the groove.

6. A component rotatable about an axis of rotation, comprising:
 a rotor having a substantially circumferentially extending groove at least in Part about the axis of rotation, opposing walls of said groove having inner and outer portions with said outer wall portions spaced a first distance from one another and said inner wall portions spaced a second distance from one another greater than said first distance;
 a balance weight having first margins with a first dimension less than said first distance enabling said balance weight, in a first orientation relative to said groove, for reception in said groove;
 said balance weight having second margins with a second dimension greater than said first dimension and said first distance such that, upon rotation of said balance weight in said groove to a second orientation relative to said groove, the second margins lie within said groove inwardly of and in registration with said outer wall portions;

a screw threadedly received in said balance weight and engaging a base of said groove, said balance weight being displaced away from said base in response to rotation of said screw relative to said balance weight to engage said second margins against said outer wall portions to retain the balance weight in the groove against circumferential and outward movement thereof relative to said groove; and said balance weight having an outer face with a slot for receiving a tool to rotate the balance weight relative to said groove from said first orientation to said second orientation, said outer wall portions comprising flanges projecting toward one another, said second margins of said balance weight in said second orientation thereof being located in said groove below said flanges and engaging said flanges in response to rotation of said screw relative to said balance weight, said second margins comprising second flanges projecting from said balance weight, said second flanges having arcuate edges along one side thereof facing in the direction of rotation of the balance weight within the groove, said outer face including a pair of female threaded openings for receiving male threaded rods for remotely installing the balance weight in the groove.

7. A component rotatable about an axis of rotation, comprising:

a rotor having a substantially circumferentially extending groove at least inp art about the axis of rotation, opposing walls of said groove having inner and outer portions with said outer wall portions spaced a first distance from one another and said inner wall portions spaced a second distance from one another greater than said first distance;

a balance weight having first margins with a first dimension less than said first distance enabling said balance weight, in a first orientation relative to said groove, for reception in said groove;

said balance weight having second margins with a second dimension greater than said first dimension and said first distance such that, upon rotation of said balance weight in said groove to a second orientation relative to said groove, the second margins lie within said groove inwardly of and in registration with said outer wall portions;

a screw threadedly received in said balance weight and encaging a base of said groove, said balance weight being displaced away from said base in response to rotation of said screw relative to said balance weight to engage said second margins against said outer wall portions to retain the balance weight in the groove against circumferential and outward movement thereof relative to said groove: and said groove having a substantially T-shaped configuration.

* * * * *

UNITED STATES PATENT AND TRADEMARK OFFICE
CERTIFICATE OF CORRECTION

PATENT NO. : 6,279,420 B1
DATED : August 28, 2001
INVENTOR(S) : Knorowski et al.

Page 1 of 1

It is certified that error appears in the above-identified patent and that said Letters Patent is hereby corrected as shown below:

Column 3,
Line 11, delete "fist" and insert -- first --.

Column 4,
Line 61, delete "comers" and insert -- corners --.

Column 5,
Line 31, delete "FIG. 3 .By" and insert -- FIG. 3. By --.

Column 8,
Line 4, delete "Part" and insert -- part --.

Column 10,
Line 4, delete "inp art" and insert -- in part --;
Line 22, delete "encaging" and insert -- engaging --; and
Line 28, "groove:" and insert -- groove; --.

Signed and Sealed this

Twenty-third Day of April, 2002

Attest:

Attesting Officer

JAMES E. ROGAN
Director of the United States Patent and Trademark Office